United States Patent [19]
Heinrich

[11] Patent Number: 5,379,287
[45] Date of Patent: Jan. 3, 1995

[54] DISC RETAINING DEVICE FOR A DISC PLAYER

[75] Inventor: Norbert Heinrich, Vienna, Austria

[73] Assignee: U.S. Philips Corporation, New York, N.Y.

[21] Appl. No.: 59,487

[22] Filed: May 10, 1993

[30] Foreign Application Priority Data

Jun. 10, 1992 [AT] Austria ............................ 1187/92

[51] Int. Cl.6 ............................................ G11B 25/04
[52] U.S. Cl. ............................................ 369/270
[58] Field of Search ............... 369/270, 271, 264, 258; 360/99.05, 99.12

[56] References Cited

U.S. PATENT DOCUMENTS

| 3,817,469 | 6/1974 | Mosciatti et al. | 242/68.3 |
| 4,109,878 | 8/1978 | Osawa | 242/68.3 |
| 4,649,532 | 3/1987 | Aldenhoven | 369/270 |
| 4,730,300 | 3/1988 | Kamoshita et al. | 369/270 |
| 4,958,839 | 9/1990 | Guzik et al. | 369/271 |

FOREIGN PATENT DOCUMENTS

| 0159100 | 10/1985 | European Pat. Off. | 369/270 |
| 60-170060 | 9/1985 | Japan . | |
| 0241757 | 10/1988 | Japan | 369/270 |
| 0157859 | 7/1991 | Japan | 369/264 |
| 2139799 | 11/1984 | United Kingdom | 369/272 |
| 2139803 | 11/1984 | United Kingdom | 369/270 |

OTHER PUBLICATIONS

Search Report.

*Primary Examiner*—A. J. Heinz
*Assistant Examiner*—Brian E. Miller
*Attorney, Agent, or Firm*—David R. Treacy

[57] ABSTRACT

An apparatus (1) for playing a disc-shaped record carrier (2) having a central positioning hole (6) has a turntable (10) which comprises a positioning member (20) which is engageable in the positioning hole (6) and in which a pressure device 130) is arranged, the positioning member (20) having an annular recess (32) and the pressure device (30) comprising a coil spring (33) having turns (34) which project radially from the recess (32) to cooperate with a record carrier (2). The maximum height (H) of the recess (32) is smaller than the outer diameter (D) of the coil spring (33) in its no-load condition before it is mounted in the recess (32), and in the recess (32) the turns (34) of the coil spring (33) are held in an operational inclination condition (B) which is less steep than their comparatively steep no-load inclination condition (A). (FIG. 3)

22 Claims, 3 Drawing Sheets

DISC RETAINING DEVICE FOR A DISC PLAYER

BACKGROUND OF THE INVENTION

The invention relates to an apparatus for recording and/or reading information on/from a disc-shaped record carrier having a central positioning hole, which apparatus comprises a turntable which is rotatable about an axis and on which the record carrier can be placed coaxially, which turntable comprises a positioning member which is engageable in the positioning hole and is substantially centrically symmetrical relative to the axis, in which positioning member a pressure device is arranged to press the record carrier onto the turntable in the axial direction, the positioning member having an annular recess, which is coaxial with the axis and which is open in a radially outward direction, and the pressure device comprising a coil spring arranged in the recess and having turns which project radially from the recess in the positioning member to cooperate with a record carder, which has been placed onto the turntable, in the area of the positioning hole of said record carrier in order to press the record carrier against the turntable in the axial direction.

Such an apparatus of the type defined in the opening paragraph is known, for example, from EP 0,159,100 A1 to which U.S. Pat. No. 4,649,532 corresponds (herewith incorporated by reference). In this known apparatus the annular space in the positioning member of the turntable has such a height in the axial direction of the turntable that when the coil spring is mounted in the recess the turns of this spring retain their original no-load inclination relative to the axis of the coil spring viewed in a radial direction. This no-load inclination of the turns of the coil spring relative to the coil-spring axis depends on the parameters of the coil spring. In the no-load condition the angle between the turns of a coil spring and the coil-spring axis viewed in a radial direction is large and deviates only to a comparatively small extent from 90°. As a result of this, the turns of the coil spring in the prior-art apparatus act upon a record carrier in the area of its positioning hole mainly in the radial direction of the turntable. However, in this way only comparatively small pressures can be obtained for axially pressing the record carder onto the turntable. In the prior-art apparatus a record carrier is therefore pressed onto the turntable in a comparatively unreliable manner, so that the risk that a record carrier is not satisfactorily pressed onto the turntable by the coil spring and comes clear of the turntable is comparatively great. This risk is particularly great in the case of shock-like loads as occurring comparatively frequently with apparatuses for use in motor vehicles and with portable apparatuses.

SUMMARY OF THE INVENTION

It is an object of the invention to mitigate the above problems and to ensure that in an apparatus of the type defined in the opening paragraph a record carrier is reliably pressed onto the turntable of such an apparatus in a very simple manner. To this end the invention is characterized in that in the direction of the axis of the turntable the annular recess in the positioning member of the turntable has a maximum height smaller than the outer diameter of the coil spring in its no-load condition before it is mounted in the recess, and in the recess the turns of the coil spring are held in an operational inclination condition relative to the coil-spring axis, in which condition the turns, viewed in a radial direction, have an inclination relative to the coil-spring axis which is less steep than in their no-load inclination condition before the coil spring is mounted in the recess. In this way it is achieved that when the coil spring is mounted in the recess in the positioning member of the turntable the turns of this spring, viewed in the radial direction, are given an operational inclination relative to the coil-spring axis which is less steep than the comparatively steep no-load inclination, so that in the mounted condition of the coil spring the turns of the coil spring occupy a comparatively flat position and the individual turns of the coil spring are preloaded, as a result of which during the cooperation with a record carder the turns of the coil spring act upon the record carder in the area of its positioning hole with a comparatively gentle inclination and with a comparatively large force. Thus, it is achieved that the individual turns of the coil spring act upon the record carder in the area of its positioning hole mainly in the axial direction of the turntable and exert a comparatively large force component on the record carder in the axial direction of the turntable, as a result of which the record carrier is held on the turntable in a very reliable manner.

The height of the annular recess in the axial direction of the turntable may remain substantially the same in the radial direction. However, it is found to be particularly advantageous if the annular recess is shaped in such a way that its height decreases from the location of its maximum height in a radially inward direction. Thus, the taper of the recess impedes a radially inward excursion of the turns of the coil spring and in the case of a radial excursion of the turns, as occurs when a record is placed onto and also when it is removed from the turntable, the turns assume an even flatter position, viewed in the radial direction, in comparison with their normal operational inclination and are consequently preloaded to a greater extent, which substantially precludes an undesired disengagement of the record carrier from the turntable and ensures that a record carrier is held on the turntable in a particularly reliable manner.

It is also found to be particularly advantageous if in the annular recess at least three ridges connected to the turntable are provided, which ridges are each situated between two turns of the coil spring in the recess and each have a radially outward bounding surface serving as a positioning surface for radially positioning the record carder on the turntable. This ensures that with particularly simple means an excellent positioning of the record carder on the turntable in the radial direction thereof is obtained.

Moreover, it is also found to be particularly advantageous if the coil spring is arranged on a mounting ring having one interruption in the form a substantially radial slit. In this way a particularly simple and, if desired, automated mounting of the coil spring which has been pre-fitted onto the mounting ring is achieved.

It is also found to be particularly advantageous if the turntable has a separating zone which separates the turntable transversely of its axis and which terminates in the recess in the positioning member of the turntable, which zone divides the turntable into two turntable parts which are interconnected by means of a connecting device to form the turntable. This has the advantage that the manufacture of the complete turntable, including the pressure device arranged in its positioning member, can be simplified as far as possible.

In this respect it is found to be particularly advantageous if the connecting device is formed by at least one bayonet joint. Such a bayonet joint guarantees a simple assembly and a reliable coupling of the two turntable parts.

The invention will be described in more detail hereinafter with reference to the drawings which show an exemplary embodiment to which the invention is not limited. FIG. 1 is a diagrammatic oblique view of an apparatus for playing a disc-shaped record carrier. FIG. 2 is a diagrammatic plan view to substantially full scale, showing a disc-shaped record carrier, generally referred to as a Compact Disc, which can be optically scanned and can be loaded into the apparatus shown in FIG. 1. FIG. 3 is a sectional view to about five times full scale, taken on the line III—III in FIG. 4 and showing a turntable of the apparatus shown in FIG. 1, onto which the record carrier 2 can be placed and which has a pressure device comprising a coil spring for pressing the record carrier onto the turntable. FIG. 4 is a plan view, also to about five times full scale, showing a main part of the turntable shown in FIG. 3. FIG. 5 is a plan view, also to about five times full scale, showing a coil spring forming part of the pressure device of the turntable shown in FIG. 3. FIG. 6 is a side view taken on the arrow VI in FIG. 5 and to about twice full scale, showing a part of the coil spring shown in FIG. 5, fitted on the mounting ring.

DESCRIPTION OF THE PREFERRED EMBODIMENT

Figure 1:
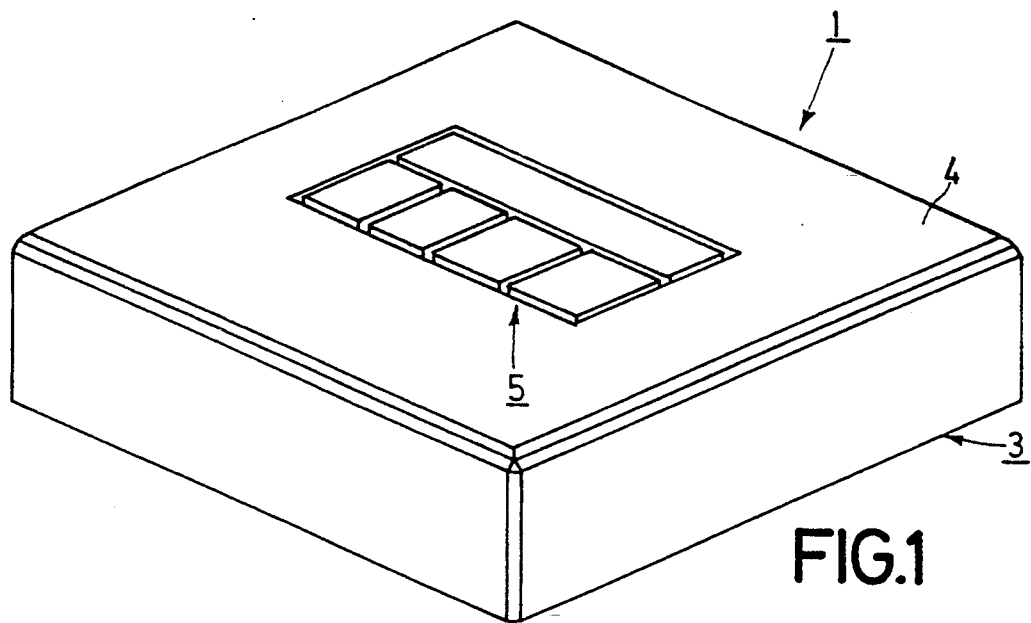
Figure 2:
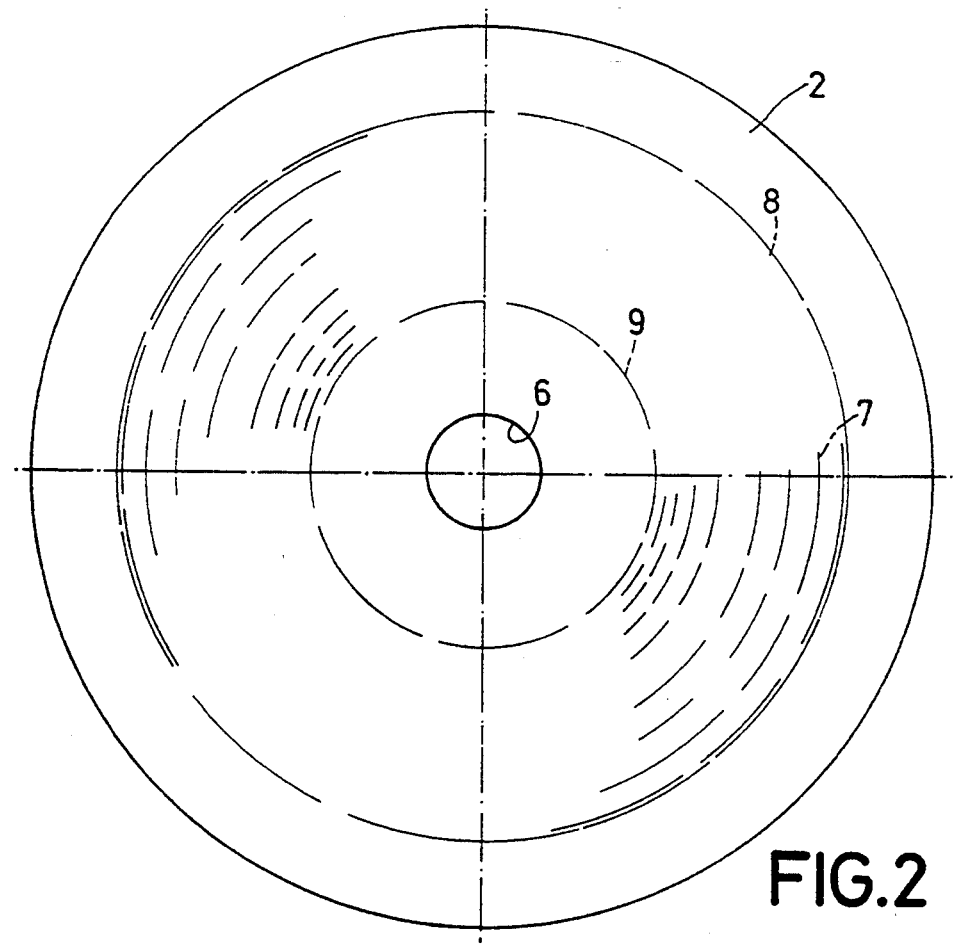

FIG. 1 shows an apparatus 1 for playing a disc-shaped record carrier 2, shown in FIG. 2. The apparatus 1 has a rectangular housing 3, whose upper side can be closed by means of a pivotable cover 4. This cover 4 carries a set 5 of keys by means of which the various modes of operation of the apparatus 1 can be started. The record carrier 2 can be introduced into the apparatus 1 when the cover 4 is pivoted away from the housing 3.

As is shown in FIG. 2 the disc-shaped record carrier 2 has a central positioning hole 6. At its underside the record carrier 2 has a spiral track 7 which can be scanned optically and which extends between an outermost track portion 8 and an innermost track portion 9, as is shown diagrammatically in broken lines in FIG. 2. The track 7 stores information signals representing, for example, pieces of music. Such a record carrier is generally referred to as a Compact Disc or, briefly, CD.

Figure 3:
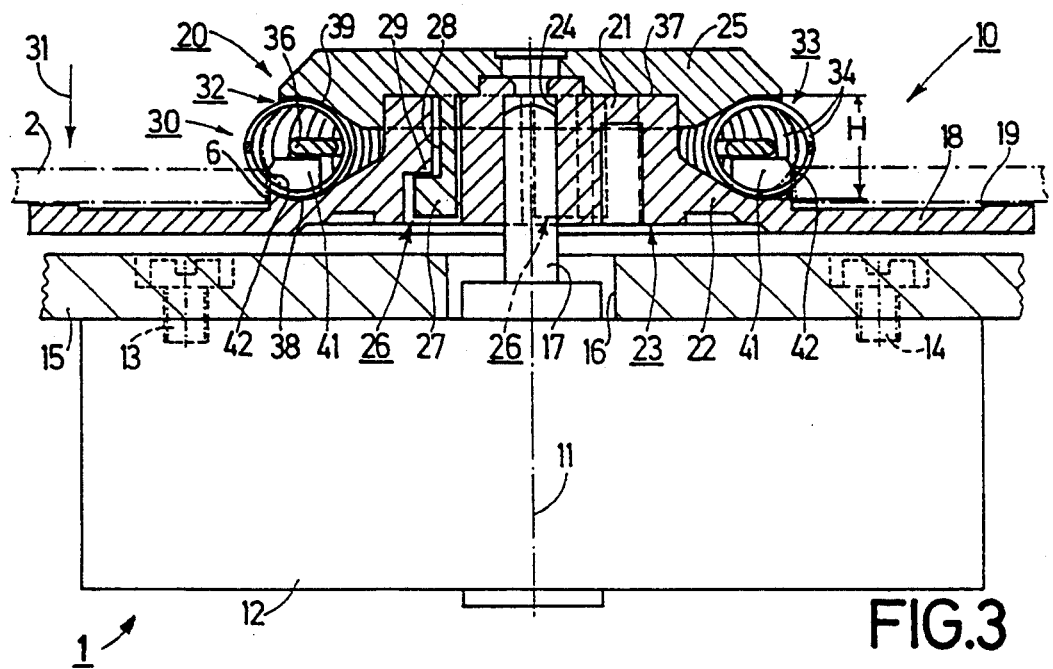

As is apparent from FIG. 3 the apparatus 1 comprises a turntable 10 for holding and rotating a record carder 2, which record carrier 2 can be placed coaxially on this turntable. The turntable 10 is rotatable about an axis 11. For this purpose the apparatus 1 comprises a motor 12, which is secured to a deck plate 15 of the apparatus 1 by means of screws 13 and 14. A drive shaft 17 of the motor 12 extends through a hole 16 in the deck plate 15 and carries the turntable 10.

The turntable 10 has a substantially circular and disc-shaped supporting member 18 having an circular raised portion 19 at its outer circumference, on which the record carder 2, shown diagrammatically in dash-dot lines in FIG. 3, can be placed. The turntable 10 further comprises a positioning member 20 which is connected to the dish-like supporting member 18, which is engageable in the positioning hole 6 of the record carder 2, and which is substantially centrically symmetrical relative to the axis 11. In the present case the positioning member 20 consists of a base 23 of the turntable 10, which base comprises a central cylindrical bearing portion 21, which is integral with the supporting member 18, and a conical connecting portion 22, and has a central bore 24 in which the drive shaft 17 of the motor 12 engages, and of a cap 25, which is connected to the base 23 by means of three bayonet joints 26. Each bayonet joint 26 comprises a substantially L-shaped hook 27 which projects from the cap 25, which hook is inserted into a recess 28 in the base 23 and upon rotation of the cap 25 relative to the base 23 engages with its angular free end behind a shoulder 29 in the base 23, thus securing the cap 25 to the base 23.

A pressure device 30 is arranged in the positioning member 20 to press the record cattier 2 onto the turntable 10, i.e. the raised portion 19 on the supporting member 18, in the axial direction indicated by the arrow 31. The positioning member has an annular recess 32, which is coaxial with the axis 11 and which is open in a radially outward direction. The device 30 comprises a coil spring 33 arranged in the recess 32 and having turns 34 which project radially from the recess 32 in the positioning member 20 and which cooperate with the record carrier 2 on the turntable 10 in the area of the positioning hole 6 in order to press the record carrier against the turntable 10, i.e. against the raised portion 19 on the supporting member 18, in the axial direction 31. FIG. 3 shows the coil spring 33 with its turns 34 in solid lines in the situation that the turntable 10 does not carry a record carrier 2. When a record carrier 2 is placed on the turntable 10, as is shown by a dash-dot line in FIG. 3, the turns 34 of the coil spring 33 are moved into the recess 32 in a radial direction, the turns 34 then occupying a position as also represented diagrammatically by a dash-dot line in FIG. 3.

Figure 5:
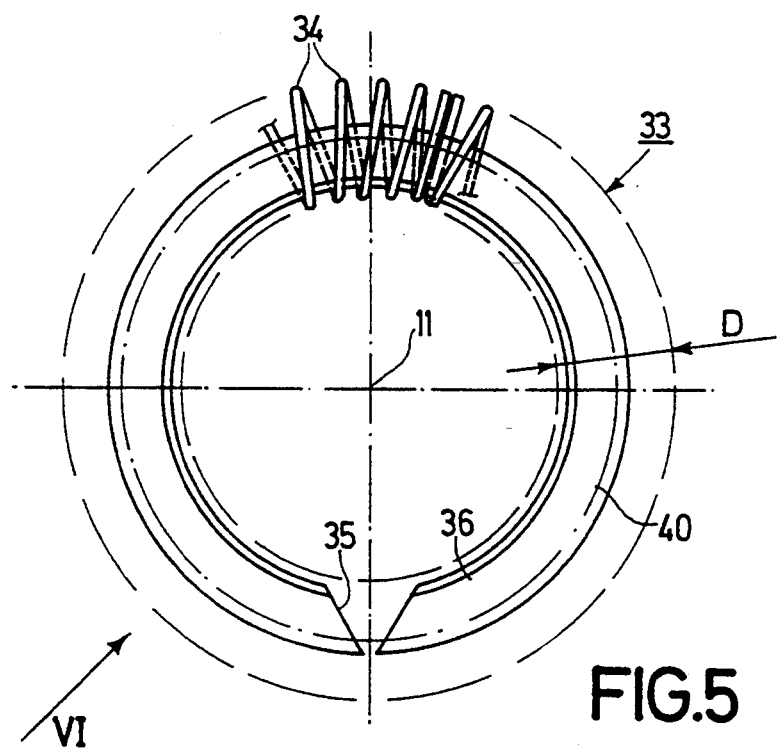
Figure 6:
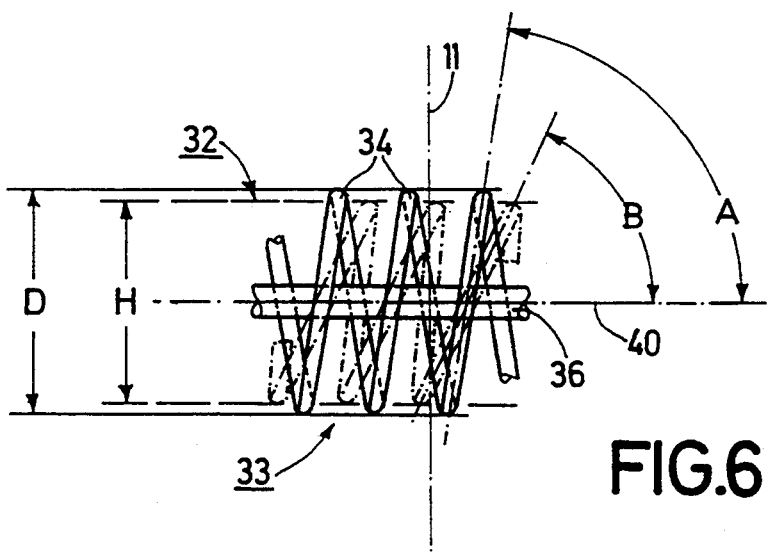

As is apparent from FIGS. 5 and 6, the coil spring 33 is fitted onto a mounting ring 36 having one interruption in the form a substantially radial slit 35. In this way the coil spring 33 can be fitted simply onto the mounting ring 36 before it is mounted in the recess 32 in the positioning member 20, as is shown in FIGS. 5 and 6.

As stated hereinbefore, the turntable 10 basically comprises two turntable parts, i.e. the base 23 together with the supporting member 18, which is integral therewith, and the cap 25, which are separated from one another by a separating zone 37 which separates the turntable 10 transversely of its axis 11 and which terminates in the recess 32 in the positioning member 20 of the turntable 10. Before the coil spring 33 is mounted in the recess 32 the two turntable parts 23, 18 and 25 are separated from one another. In this condition the coil spring 33, which has been fitted onto the mounting ring 36, is placed onto the lower bounding wall 38 of the recess 32, which is a wall of the base 23. Subsequently, the cap 25 is placed onto the base 23 so that the L-shaped hooks 27 enter the recesses 28, after which the cap 25 is slightly rotated relative to the base 23, as result of which the bayonet joints 26 are actuated and the L-shaped hooks 27 engage behind the shoulders 29, thereby securing the cap 25 to the base 23. When the cap 25 is thus secured to the base the upper bounding wall 39 of the recess 32, which is a wall of the cap 25, comes into contact with the coil spring 33 in the recess 32.

In the present apparatus 1, as is apparent in particular from FIG. 6, the annular recess 32, represented diagrammatically in broken lines in FIG. 6, has a height H in the axial direction 11 of the turntable 10 smaller than the outer diameter D of the coil spring 33 in its no-load condition before it is mounted in the recess 32, which no-load condition is shown in solid lines in FIG. 6. The operational condition of the coil spring 33, i.e. when mounted in the recess 32, is shown in dash-dot lines in FIG. 6. As is also apparent from FIG. 6, the turns 34 of the coil spring 33 in the recess 32 are held in an operational inclination condition B relative to the coil-spring axis 40, in which condition the turns 34, viewed in a radial direction relative to the axis 11 of the turntable 10, have an inclination relative to the coil-spring axis 40 which is less steep than in their no-load inclination A before the coil spring 33 is mounted in the recess 32.

As is apparent from FIG. 3, the annular recess 32 is shaped in such a way that its height decreases, i.e. it tapers, from the location of its maximum height H in a radially inward direction.

Figure 4:
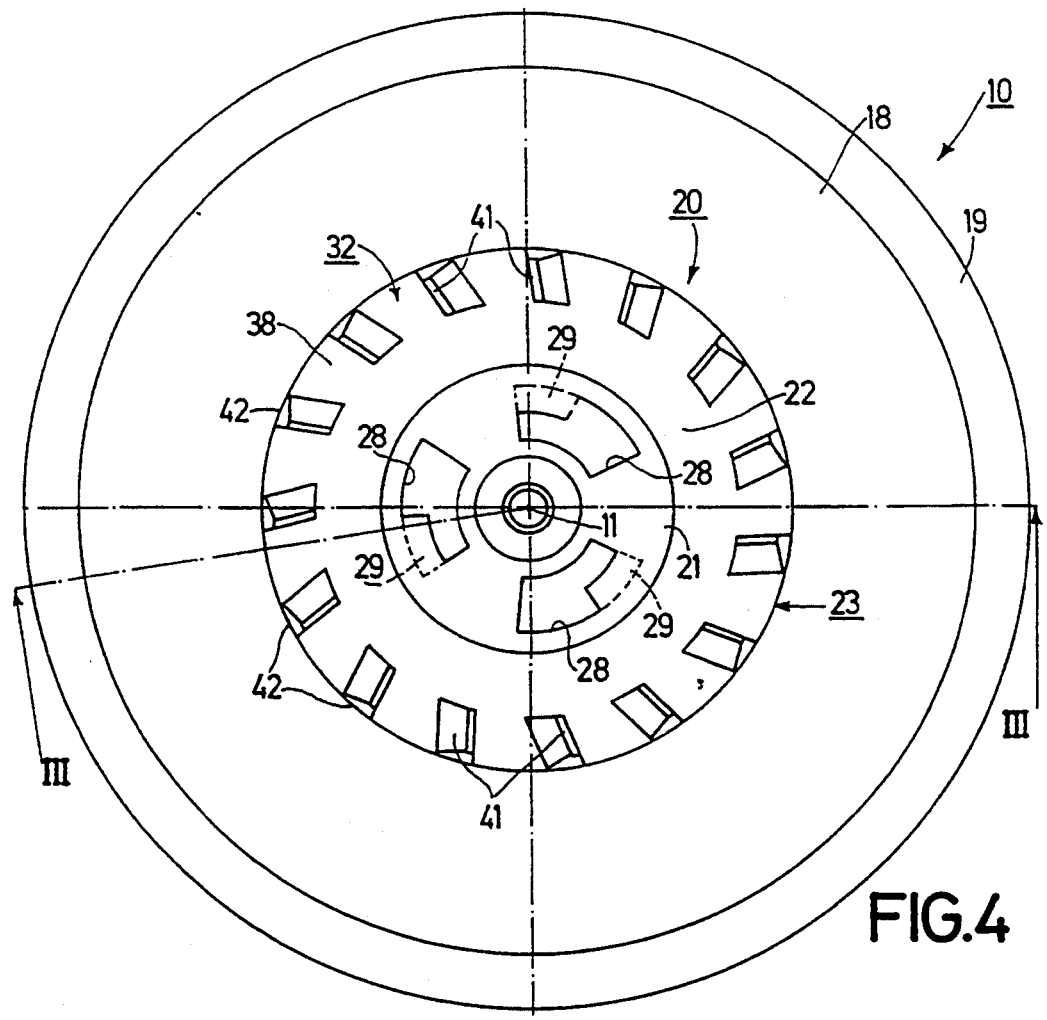

FIG. 3 and, particularly, FIG. 4 show that in the annular recess 32 fifteen ridges 41 connected to the turntable 10 are provided, which ridges are each situated between two turns 34 of the coil spring 33 in the recess 32 and each have a radially outward bounding surface 42 serving as a positioning surface for radially positioning the record carrier 2 on the turntable 10.

In the apparatus described above it is achieved in a particularly simple manner that when the coil spring is mounted in the recess in the positioning member of the turntable the turns of this spring, viewed in the radial direction, are given an operational inclination relative to the coil-spring axis which is less steep than the comparatively steep no-load inclination, so that in the mounted condition of the coil spring the turns of the coil spring occupy a comparatively flat position and the individual turns of the coil spring are preloaded. As a result of this, the individual turns of the coil spring act upon the record carrier mainly in the axial direction of the turntable and exert a comparatively large force component on the record carrier in said axial direction, so that the record carrier is very securely held on the turntable. As a result of the inward taper of the recess it is also achieved that for the removal of a record carrier from the turntable an additional action of the coil spring has to be overcome, which substantially precludes an inadvertent disengagement of the record carrier from the turntable.

In an apparatus as described above it is found to be particularly advantageous, for example, if the coil spring is made of spring wire having a wire diameter of 0.15 mm, the circumferential length of the coil spring along the spring axis is approximately 42 mm, the outer diameter of the turns is approximately 3 mm and the maximum height of the recess for the coil spring is approximately 2.7 mm, and if the turns of the coil spring in its no-load condition outside the recess, viewed in the radial direction, have an inclination A of approximately 81° relative to the spring axis, and in its operational condition inside the recess, viewed in the radial direction, have an inclination B of approximately 65° to 66° relative to the spring axis when no record carrier has yet been placed onto the turntable. With a record carrier placed on the turntable the inclination B relative to the spring axis changes to a value of approximately 63° to 60°, which depends on the thickness of the record career and the diameter of the positioning hole of the record carrier. During placement and removal of a record carrier the inclination B can decrease to a value of approximately 55° to 50° because the coil spring with its turns is then urged comparatively far into the tapered recess, so that the turns are then preloaded to a comparatively large extent, which substantially precludes an inadvertent removal of the record carrier from the turntable.

The invention is not limited to the embodiment described hereinbefore. In the above embodiment the coil spring is a left-handed spring but a right-handed spring may also be used. It is also conceivable to dispense with the ridges which have been provided in the recess for the radial positioning of the record carrier, in which case the radial positioning of the record carrier can be effected, for example, by a cylindrical portion of the positioning member, possibly in cooperation with the turns of the coils spring. The invention can also be used with other record carriers having a central positioning hole, for example record carders which can be scanned magnetically.

I claim:

1. An apparatus for recording and/or reading information, comprising a turntable and means for mounting said turntable for rotation about a turntable axis,
   said turntable comprising a supporting member, and a positioning member for positioning a disc-shaped record carrier having a central positioning hole, placed on the supporting member, said positioning member being substantially symmetrical about said axis and being engageable in said positioning hole,
   said positioning member having an annular recess coaxial with said axis and open in a radially outward direction, and a coil spring arranged in said recess for pressing said record carrier in an axial direction onto the turntable; said coil spring having a spring axis which is substantially concentric with, and lies in a plane which is substantially perpendicular to, said turntable axis, and turns which project radially from said recess to engage said record carrier adjacent said position hole, in a no-load condition of said spring before it is mounted in said recess said spring having a given outer diameter, and said turns having an unloaded inclination relative to said spring axis,
   characterized in that said annular recess has a maximum height, in a direction parallel to said turntable axis, smaller than said given outer diameter, and
   said turns of the coil spring are held in an operational inclination, in a direction parallel to said turntable axis and relative to said spring axis, less steep than said unloaded inclination.

2. An apparatus as claimed in claim 1, characterized in that said annular recess has a cross section shaped such that the height in said direction decreases from the location of said maximum height in a radially inward direction.

3. An apparatus as claimed in claim 2, characterized in that said positioning member comprises at least three ridges in said recess, each ridge being disposed between two adjacent turns of said coil spring, and each ridge having a radially outer bounding surface arranged for engaging said central hole to radially position said record carrier on the turntable.

4. An apparatus as claimed in claim 3, characterized in that said positioning member further comprises a mounting ring having a substantially radial slit, said coil spring being arranged on said mounting ring.

5. An apparatus as claimed in claim 4, characterized in that said turntable comprises a connecting device, and has a separating zone extending transversely of said turntable axis and terminating in said recess, said zone dividing said turntable into two parts; and said connecting device interconnects said two parts.

6. An apparatus as claimed in claim 5, characterized in that said connecting device is formed by at least one bayonet joint.

7. An apparatus as claimed in claim 2, characterized in that said positioning member further comprises a mounting ring having a substantially radial slit, said coil spring being arranged on said mounting ring.

8. An apparatus as claimed in claim 7, characterized in that said turntable comprises a connecting device, and has a separating zone extending transversely of said turntable axis and terminating in said recess, said zone dividing said turntable into two parts; and said connecting device interconnects said two parts.

9. An apparatus as claimed in claim 8, characterized in that said connecting device is formed by at least one bayonet joint.

10. An apparatus as claimed in claim 2, characterized in that said turntable comprises a connecting device, and has a separating zone extending transversely of said turntable axis and terminating in said recess, said zone dividing said turntable into two parts; and said connecting device interconnects said two parts.

11. An apparatus as claimed in claim 10, characterized in that said connecting device is formed by at least one bayonet joint.

12. An apparatus as claimed in claim 1, characterized in that said positioning member comprises at least three ridges in said recess, each ridge being disposed between two adjacent turns of said coil spring, and each ridge having a radially outer bounding surface arranged for engaging said central hole to radially position said record carrier on the turntable.

13. An apparatus as claimed in claim 12, characterized in that said positioning member further comprises a mounting ring having a substantially radial slit, said coil spring being arranged on said mounting ring.

14. An apparatus as claimed in claim 13, characterized in that said turntable comprises a connecting device, and has a separating zone extending transversely of said turntable axis and terminating in said recess, said zone dividing said turntable into two parts; and said connecting device interconnects said two parts.

15. An apparatus as claimed in claim 14, characterized in that said connecting device is formed by at least one bayonet joint.

16. An apparatus as claimed in claim 12, characterized in that said turntable comprises a connecting device, and has a separating zone extending transversely of said turntable axis and terminating in said recess, said zone dividing said turntable into two parts; and said connecting device interconnects said two parts.

17. An apparatus as claimed in claim 16, characterized in that said connecting device is formed by at least one bayonet joint.

18. An apparatus as claimed in claim 1, characterized in that said positioning member further comprises a mounting ring having a substantially radial slit, said coil spring being arranged on said mounting ring.

19. An apparatus as claimed in claim 18, characterized in that said turntable comprises a connecting device, and has a separating zone extending transversely of said turntable axis and terminating in said recess, said zone dividing said turntable into two parts; and said connecting device interconnects said two parts.

20. An apparatus as claimed in claim 19, characterized in that said connecting device is formed by at least one bayonet joint.

21. An apparatus as claimed in claim , characterized in that said turntable comprises a connecting device, and has a separating zone extending transversely of said turntable axis and terminating in said recess, said zone dividing said turntable into two parts; and said connecting device interconnects said two parts.

22. An apparatus as claimed in claim 21, characterized in that said connecting device is formed by at least one bayonet joint.

* * * * *